Jan. 26, 1965   J. A. MELENRIC   3,166,904
COMBUSTION CHAMBER FOR GAS TURBINE ENGINES
Filed May 18, 1960   2 Sheets-Sheet 2
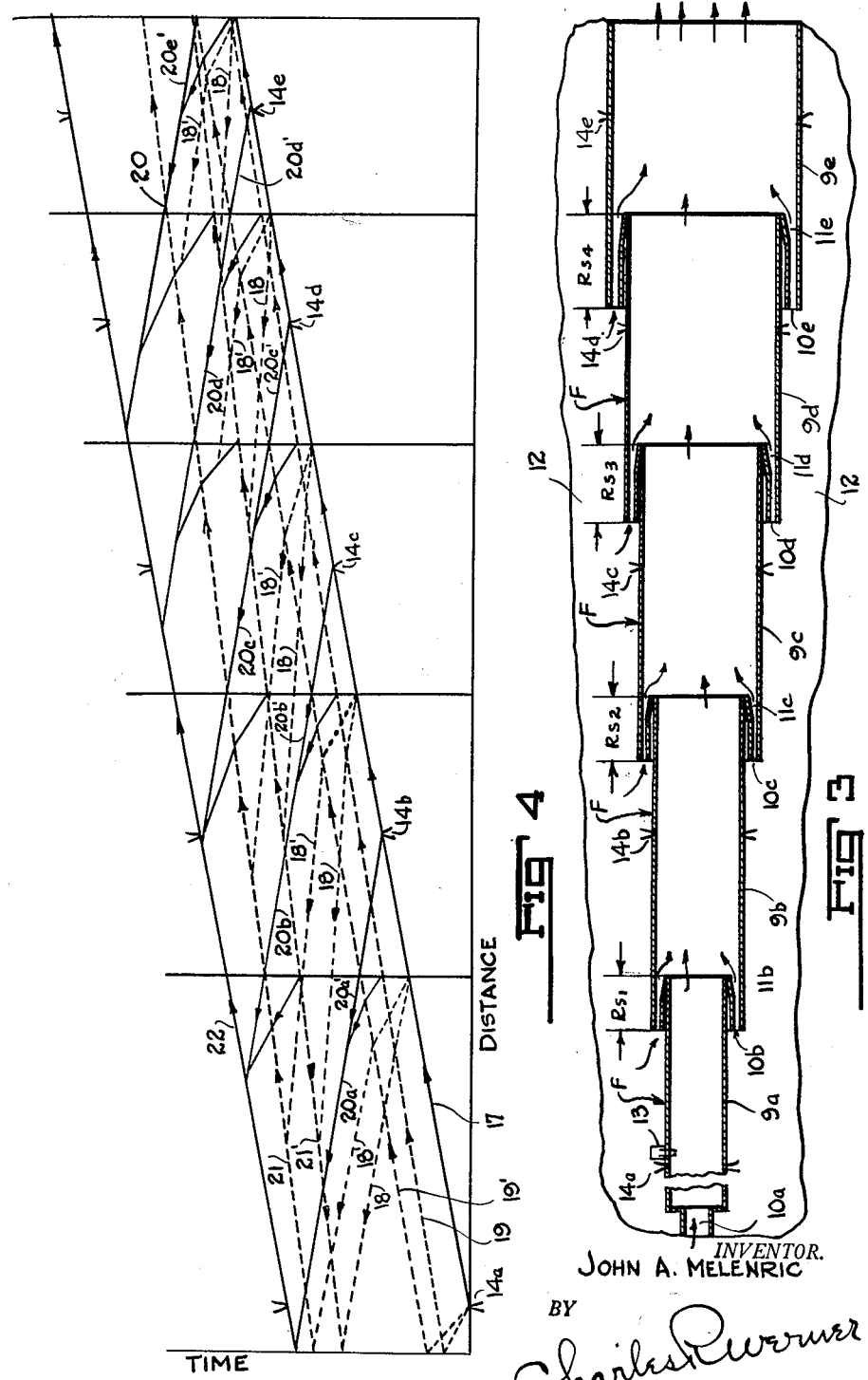
INVENTOR.
JOHN A. MELENRIC
BY
Charles R. Werner
ATTORNEY

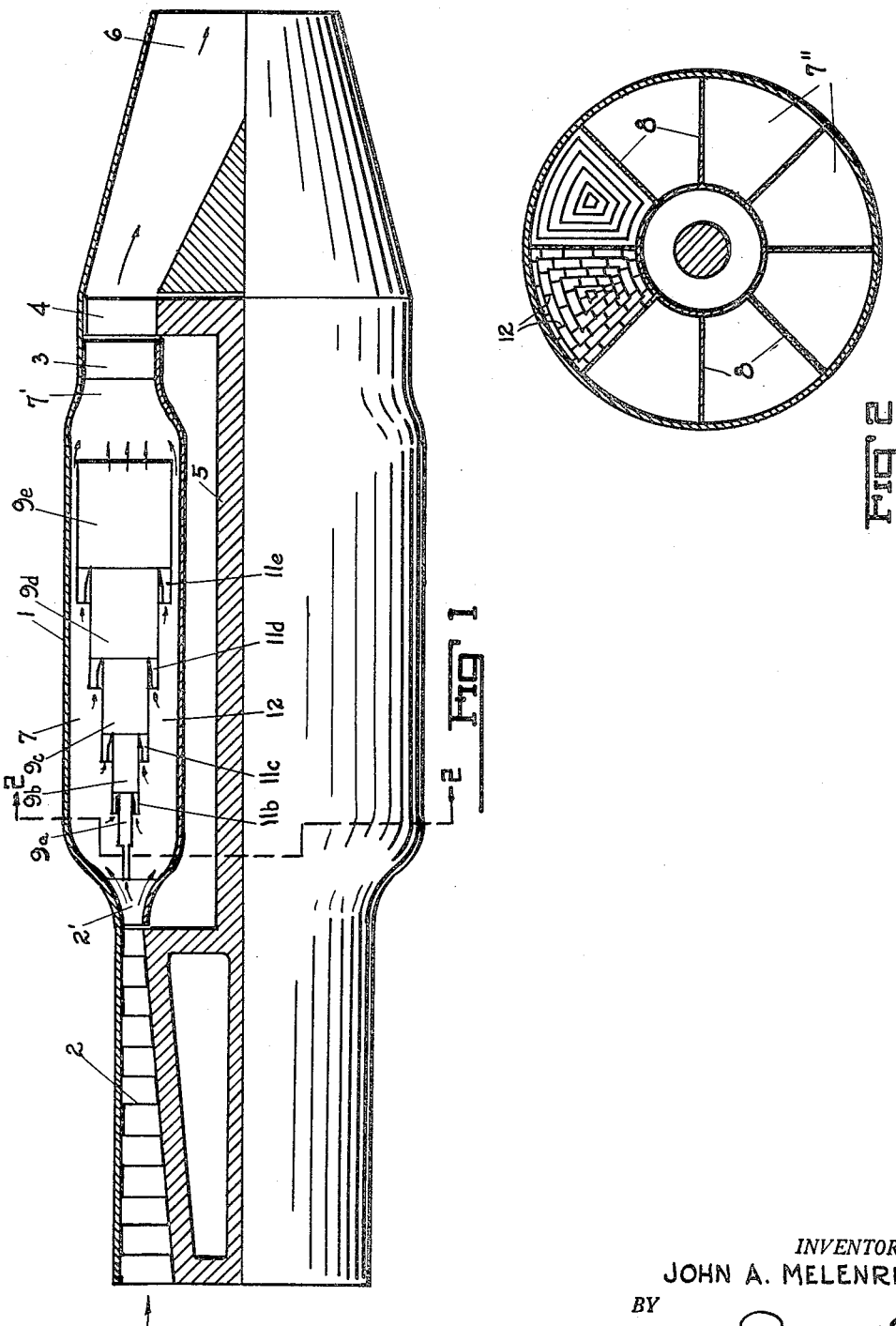

3,166,904
COMBUSTION CHAMBER FOR GAS TURBINE ENGINES
John Alden Melenric, 409 East Lane, Wichita, Kans.
Filed May 18, 1960, Ser. No. 32,068
2 Claims. (Cl. 60—39.69)

This invention relates in general to gas turbine engines and in particular to a new and improved form of combustion chamber therefor, which will overcome to a great extent the serious problem of pressure drop in present day combustion chambers.

Based on the theory that more energy can be obtained by burning fuel at faster rates in combustion chambers, it is believed that if combustion takes place under constant volume conditions, a large increase in work done is achieved.

It is therefore the primary purpose of my invention to construct a combustion chamber wherein combustion can take place under constant volume conditions throughout the combustion chamber, with combustion occurring so rapidly and at such high frequency as to reach a condition approximating steady or constant pressure, virtually eliminating the serious handicap of pressure drop.

In analyzing the operation of a typical pulse jet engine it is found that constant volume combustion is substantially achieved with compression and expansion waves playing an important part, a graphical analysis illustrating how these waves act in the combustion cycle, the action being comparable to internal combustion engine pistons, with the exception that at present these "pistons" or compression and expansion waves are exhausted and are not reused.

It is therefore another object of my invention to construct a gas turbine engine with a combustion chamber in which a plurality of related banks of burners are provided, the products of combustion from one bank of burners feeding into the adjacent bank of burners, each related burner in each bank being progressively larger in volume.

These and other objects, as well as the construction, operation and principles of my invention will be better understood by reference to the following specifications in connection with the accompanying drawings, in which:

FIG. 1 is a longitudinal view, partly in cross-section, of one form of my invention.

FIG. 2 is a transverse cross-sectional view on the line 2—2 of FIG. 1, showing in detail only one set of burners, the remainder being like and omitted for clarity.

FIG. 3 is an enlarged, longitudinal section through one series of burners.

FIG. 4 is a graphical, combustion time-distance presentation indicating buildup of compression and expansion waves from burner to burner and theoretical position of expansion and compression waves at any time.

Referring now to the drawings by numerals of reference, 1 designates a turbine housing with conventional compressor 2, fixed turbine blades 3, movable turbine blades 4 on rotatable shaft 5, and exhaust passage 6.

The combustion chamber 7 between the compressor 2 and the turbine blades 3 and 4 is considerably enlarged in area over the reduced end 2' of the compressor, said combustion chamber being reduced again in area at the discharge end 7' where it joins the turbine.

As seen in FIG. 2, the combustion chamber 7 is preferably circular in cross-section and may have radial dividers 8 to break up the combustion chamber into a plurality of sections 7''.

Within each combustion chamber 7'' is a plurality of burners 9a, 9b, 9c, 9d and 9e, the number shown being for illustrative purposes only, inasmuch as it may be desirable to use other than the specific number shown.

It will be seen that each burner is progressively larger than the preceding burner, one burner extending partially into the next burner, burner 9a having a central inlet 10a and the remaining burners having annular air inlets 10b, 10c, 10d and 10e, respectively, each air inlet surrounding the preceding burner, flanges 11b, 11c, 11d and 11e suitably supporting one burner to the next, with exterior supports 12 between the burners and the turbine housing 1, said flanges and exterior supports serving as air guide vanes. The length of air inlet passage 10a and the distance which each burner extends into the succeeding burner to provide an air inlet passage may vary with operating characteristics, it being important that this distance produce an air inlet passage capable of maximum wave reflection by proper "tuned" relationship between the air inlet passage and the succeeding burner. This overlap between burners, which is its resonance producing relationship, is designated as $Rs_1$, $Rs_2$, $Rs_3$, $Rs_4$, etc.

It is to be noted that the air inlet passages terminate in flared portions to meet the burners thereby providing an increased area and acting as diffusers for the purpose hereinafter specified.

The burners are shown substantially rectangular in cross section which appears at present to be preferable from a constructional standpoint. However, I do not wish to be limited to any specific configuration in the construction of the burners as it may be found advantageous in actual construction to make the burners circular in diameter without impairing the efficiency thereof.

Each initial burner 9a is provided with a suitable spark plug 13 for starting the burning process, combustion being thereafter supported in the initial burner and the other burners by heat in the chamber and residual gases.

Fuel manifolds 14a, 14b, 14c, 14d and 14e are provided for the burners and may be supplied with a steady stream of fuel or the fuel may be supplied intermittently; in either case the construction and arrangement of fuel systems being well known to the art, it is not deemed necessary to illustrate same herein, the choice of systems depending on which will achieve the best engine performance. A legend F is used to indicate the fuel manifolds at each burner.

*Operating characteristics*

The physical aspects of one form of my invention having been described I will now describe the operation and analysis of the performance of the engine employing my principles.

With the primary objective being that of constant volume combustion, my engine operates in the following manner:

Air enters the compressor 2 where it is compressed and discharged from reduced end 2' into combustion chamber 7, diffusing and decreasing in velocity while increasing in pressure. This low velocity, high pressure air completely fills the combustion chamber and surrounds all the burnerst 9a to 9e, and is constantly entering air inlet passages 10a to 10e. The flaring portion at each inlet acts as a diffuser whereby the air entering each burner is further slowed down in velocity and increases in pressure.

With fuel being supplied through manifolds 14a to 14e and ignition in the first burner by spark at igniter 13, combustion is started and then maintained by the heat in the chamber and burners and the residual gases.

As a theoretical example of engine performance, assuming an effective length of one foot for burner 9a, with combustion acoustically timed and taking place 540 times per second, each of the remaining burners being proportioned for the same combustion frequency of 540 times a second, then with annular banks of twelve burners we would have $5 \times 540 \times 12 = 32,400$ times per second combustion frequency. If the engine produces 5000 lbs.

thrust, average thrust from each combustion source would be only .15 lb. Controlling thrust would require merely the employment and control of any desired number of fuel manifolds. A combustion frequency of 32,400 times per second can be considered for all essential purposes as constant pressure burning.

The diagrammatic view in FIG. 4 illustrates the action of expansion and compression waves in each burner with the distance being the length of each burner. This view, when used in conjunction with certain simple assumptions, will, with a moderate degree of accuracy, aid in tracing the combustion process in the engine. The figure illustrates the action of expansion and compression waves in each burner, the length of which is represented by the horizontal component or "distance." Holding a straight-edge parallel to the abscissa will indicate where an expansion or compression wave will be in the tube or burner at any time.

When air and fuel are ignited by spark plug 13 at the first fuel manifold with an explosive force assumed to be constant volume, the compression wave generated will move rearwardly because of the difference in pressure at the inlet and the outlet.

The expansion wave bounces off a substantially solid wall created by the diffused air entering the burner inlet passage and follows the compression wave out the discharge end of the burner.

A flutter valve of suitable construction may also be used as an alternate method of insuring good reflection of the wave with possible increased efficiency in the operation of this portion of the burner. Such valves are well known in the art and therefore have not been illustrated or further described.

It is to be noted that energy lost to high pressure air surrounding the burner is somewhat absorbed back into the burner units and cannot be considered a total loss.

Referring now to FIG. 4, in tracing the compression wave 17 from its point of origin at the fuel manifold inlet 14a we find it moving rearwardly to exhaust out the discharge end of the burners 9a to 9e, expansion waves 18 and 18' reflecting back into each preceding burner, this being a common characteristic wherever a compression wave leaves an open tube. Waves 18 and 18', upon impact with the air mass entering burner 9a reflect rearwardly into the tube as expansion waves 21 and 21', moving linearly through all the burners.

The compression wave 17 continues from burner to burner, each of which may be properly proportioned in size relative to its preceding burner to permit the wave 17 to maintain itself as a compression wave. As compression wave 17 leaves each tube and enters the succeeding burner it acts as a piston and drives cool air out with it, the cool air having mass and thus contributing to the thrust of the engine. At the same time the compression wave is drawing fresh air into each burner through the diffusers or inlet passages 10b to 10e aiding in supporting combustion in succeeding burners. Timed fuel injection and combustion takes place in each burner boosting the compression wave as it moves from burner to burner.

At the moment of combustion in burner 9a, in addition to the generation of a compression wave 17, expansion waves 19 and 19' are generated, moving toward the inlet and then reflecting rearwardly upon contact with high pressure diffused air entering the inlet passage 10a. The expansion waves 19 and 19' actually travel at a faster rate of speed than the compression wave because the latter travels at the front edge of the combusted gases which is relatively cool whereas the expansion waves travel within the hotter, combusted gases. It will be seen from FIG. 4 that expansion waves 19 will reach the exhaust end of the last burner at approximately the same time as compression wave 17.

As expansion waves 19 and 19' leave each burner they reflect back therein as compression waves 20a to 20e. The period of time between exhaust of compression wave 17 and the reflected compression waves 20a to 20e makes it possible to afterburn fuel, the successful operation of the burner depending on its ability to reburn additional fuel and air during this period.

The first afterburning takes place at theoretical point 14b although actually it will take place in a relatively large volume with combustion so timed that wave 20a' will be at the end of burner 9a just as expansion waves 19 reflect back as compression wave 20a. The afterburning in burner 9b and in each succeeding burner actually aids compression wave to compress the fresh air entering each previous burner through the air intake passage. It is also to be noted that afterburning in each burner will build up compression wave 17 as it moves from burner to burner.

A new cycle starts each time fuel is injected into the burner with compression wave 22 representing the next wave after initial wave 17, said compression wave 22 continuing through each succeeding burner reacting in the same manner as wave 17 except to a greater degree of heat and pressure as afterburning builds up. Reflected compression waves 20a to 20e intercept and are absorbed by compression wave 22.

From the foregoing it will be seen that I have devised a combustion chamber for gas turbine engines wherein a close approach to constant volume combustion is achieved with virtual elimination of pressure drop. Obviously, changes in form, proportion and details of construction may be resorted to without departing from the spirit of my invention and I reserve all rights to such changes as come within the scope of these specifications and the claims which follow.

What I claim as new and desire to secure by Letters Patent is:

1. A gas turbine engine comprising a compressor, a turbine adapted to drive the compressor, said turbine being spaced from and located aft of said compressor, an exhaust passage from the turbine, a combustion chamber located between the compressor and the turbine, a plurality of sets of burners in the combustion chamber axially aligned about the longitudinal axis of the engine, each set of burners comprising a plurality of progressively larger burners in linear alignment from front to rear of the combustion chamber, each burner in each set of burners being provided with an open end to form an air intake orifice, a discharge orifice from each burner, fuel injection means in each burner intermediate the air intake orifice and the discharge orifice, fuel ignition starting means in each of the first burners of each set of burners, air from the compressor passing simultaneously through the combustion chamber and to each air intake orifice of each burner in the sets of burners, the air discharging from the combustion chamber and mixing with the products of combustion from the last burner in each set of burners to drive the turbine and provide thrust as the mixture leaves the exhaust passage, and a flared element forming an air diffuser at the end of each air intake passage where said air intake passage discharges into the following burner.

2. A gas turbine engine comprising a compressor, a turbine adapted to drive the compressor, said turbine being spaced from and located aft of said compressor, an exhaust passage from the turbine, a combustion chamber located between the compressor and the turbine, a plurality of sets of burners in the combustion chamber axially aligned about the longitudinal axis of the engine, each set of burners comprising a plurality of progressively larger burners in linear alignment from front to rear of the combustion chamber, each burner in each set of burners being provided with an open end to form an air intake orifice, a discharge orifice from each burner, fuel injection means in each burner intermediate the air intake orifice and the discharge orifice, fuel ignition starting means in each of the first burners of each set of burners, air from the compressor passing simultaneously through the combustion chamber and to each air intake orifice of each burner in the sets of burners, the air discharging from the combustion chamber and mixing with the products of combustion from the last burner in each set of burners to drive the turbine and provide thrust as the mixture leaves the exhaust passage, and area reducing means in each air intake passage, the length of overlap and cross sectional areas of overlapping portions of adjacent burners and the area reducing means being proportioned to acoustically tune adjacent burners during combustion.

References Cited in the file of this patent

UNITED STATES PATENTS

| | | |
|---|---|---|
| 2,663,142 | Wilson | Dec. 22, 1953 |
| 2,704,435 | Allen | Mar. 22, 1955 |
| 2,705,396 | Boyce | Apr. 5, 1955 |
| 2,748,564 | Marchal | June 5, 1956 |
| 2,860,483 | Fox | Nov. 18, 1958 |
| 2,872,780 | Schmidt | Feb. 10, 1959 |

OTHER REFERENCES

Keenan, "Gas Turbine and Jet Propulsion," pages 105–119, 1946.